(12) United States Patent
Baker et al.

(10) Patent No.: US 10,738,398 B1
(45) Date of Patent: Aug. 11, 2020

(54) METHODS AND SYSTEMS FOR MAKING A SEWN PRODUCT USING A ROBOT

(71) Applicant: SoftWear Automation Inc., Atlanta, GA (US)

(72) Inventors: Michael J. Baker, Acworth, GA (US); Barrett C. Clark, Seattle, WA (US); Eric Guenterberg, Watertown, MA (US); Alexander Ren Gurney, Atlanta, GA (US)

(73) Assignee: SoftWear Automation, Inc., Cumming, GA (US)

( * ) Notice: Subject to any disclaimer, the term of this patent is extended or adjusted under 35 U.S.C. 154(b) by 0 days.

(21) Appl. No.: 16/681,609

(22) Filed: Nov. 12, 2019

(51) Int. Cl.
*D05B 19/08* (2006.01)
*G05B 19/4093* (2006.01)
*D05B 19/16* (2006.01)

(52) U.S. Cl.
CPC ............. *D05B 19/08* (2013.01); *D05B 19/16* (2013.01); *G05B 19/40932* (2013.01)

(58) Field of Classification Search
CPC ........ D05B 19/16; D05B 19/14; D05B 19/10; G05B 19/40932
USPC .................................................. 700/136–138
See application file for complete search history.

(56) References Cited

U.S. PATENT DOCUMENTS

| | | | | |
|---|---|---|---|---|
| 5,323,722 A * | 6/1994 | Goto | ................... | G05B 19/4205 112/102.5 |
| 6,367,397 B1 * | 4/2002 | Musco | ................... | D05B 15/02 112/470.07 |
| 6,755,141 B2 * | 6/2004 | Musco | ................... | D05B 15/02 112/470.07 |
| 8,763,542 B2 * | 7/2014 | Abe | ........................ | D05B 19/04 112/102.5 |
| 8,948,901 B2 * | 2/2015 | Tokura | ................... | D05B 19/08 112/102.5 |
| 9,885,131 B2 * | 2/2018 | Naka | ....................... | D05B 19/12 |
| 9,938,650 B2 * | 4/2018 | Kongo | ................... | D05B 19/02 |
| 9,957,651 B2 * | 5/2018 | Kongo | ..................... | D05C 3/02 |
| 10,017,888 B2 * | 7/2018 | Kongo | ..................... | D05C 5/06 |
| 10,017,889 B2 * | 7/2018 | Kongo | ..................... | D05C 5/04 |
| 2007/0005175 A1 * | 1/2007 | Konig | .................... | D05B 19/00 700/138 |
| 2011/0282479 A1 * | 11/2011 | Tokura | ................... | D05B 19/12 700/108 |
| 2014/0000498 A1 * | 1/2014 | Yamanashi | ............ | D05B 19/12 112/102.5 |

* cited by examiner

*Primary Examiner* — Danny Worrell
(74) *Attorney, Agent, or Firm* — Thomas Horstemeyer, LLP (57) ABSTRACT

A sewn product making apparatus such as a sewing robot can be used to produce a variety of products over a broad range of sizes, shapes or materials. Various examples are provided related to the automation of sewing robots, and the making of sewn products. In one example, among others, a system can generate a product making path using a product construction file, and instruct a sewing device and fabric mover(s) to automatically sew the product based upon the product making path. The product making path can be modified when a deviation is detected, and the sewing adjusted based upon the modified product making path. The product construction file can be generated using information from a computer aided design associated with the product.

20 Claims, 5 Drawing Sheets

METHODS AND SYSTEMS FOR MAKING A SEWN PRODUCT USING A ROBOT

FIELD OF THE DISCLOSURE

The present disclosure is generally related to the automation of sewing using a sewing robot.

BACKGROUND

The process of making sewn products still relies on human labor to cut and sew the fabrics together. As a result, many countries have lost their textile factories to cheap labor overseas. Before the textile factories moved to developing countries, some developed countries tried to automate the process of making sewn products but were unsuccessful. The value of this disclosure is a sewn product making process that would improve upon the conventional sewn product making process by providing savings on labor costs, improving accuracy, eliminating human error, and minimizing safety issues.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

BRIEF DESCRIPTION OF THE DRAWINGS

The accompanying drawings illustrate various examples of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles. Moreover, in the drawings, like reference numerals designate corresponding parts throughout the several views.

DETAILED DESCRIPTION

Disclosed herein are various examples related to automation of sewing using a sewing robot. Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems, and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
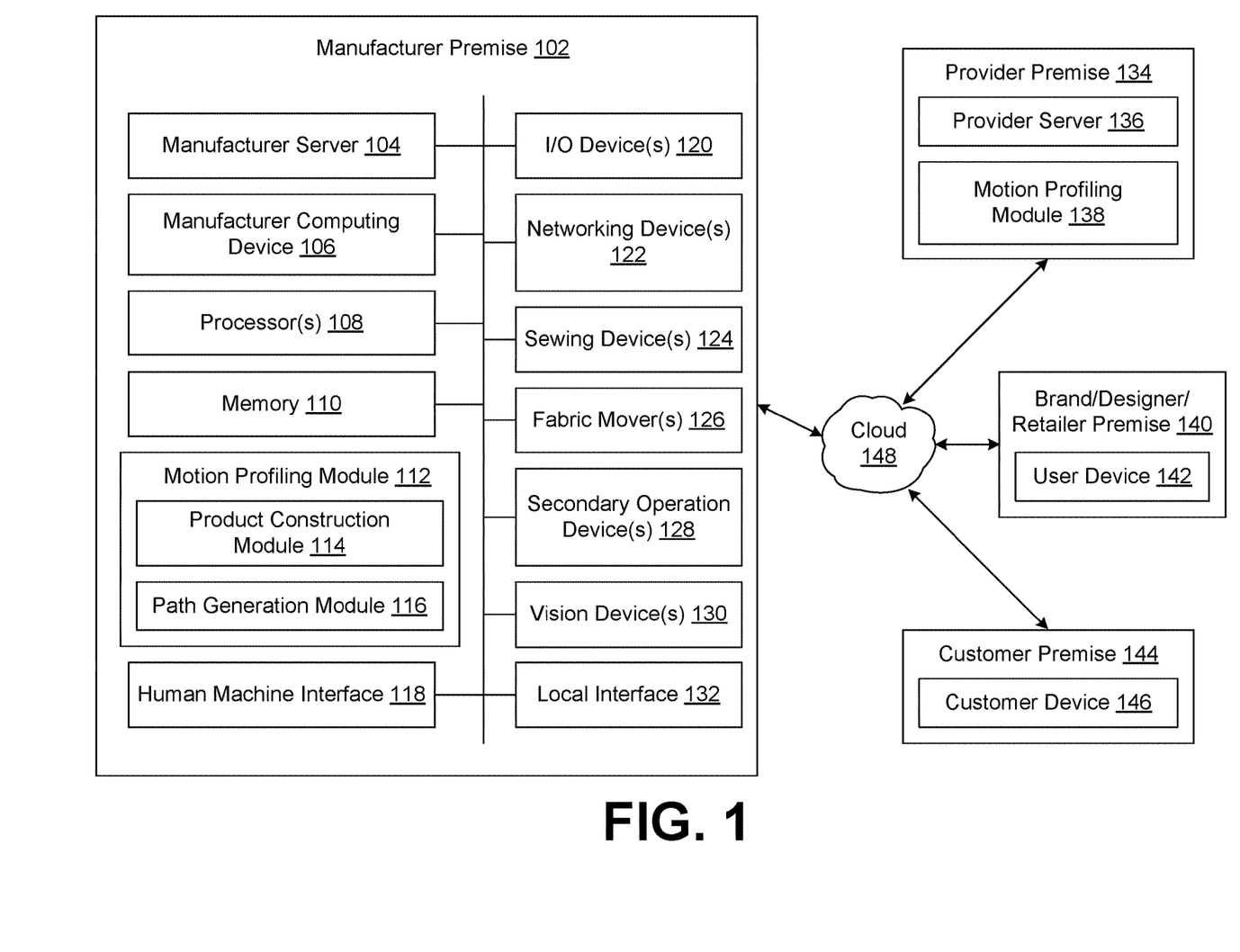
FIG. 1 illustrates an example of an automated sewing robot for making a sewn product, according to various embodiments of the present disclosure.

Referring to FIG. 1, shown is an example of a system for an automated sewing robot for making a sewn product. This system comprises a manufacturer premise 102 that can comprise a manufacturer server 104, manufacturer computing device 106, a processor 108, memory 110 with a motion profile module 112, a product construction module 114 and a path generation module 116, a human machine interface (HMI) 118, input/output (I/O) device(s) 120, networking device(s) 122, a sewing device 124, fabric mover(s) 126, secondary operation device(s) 128, vision device(s) 130, and a local interface 132. The manufacturer premise 102 can have the sewing robots to manufacture sewn products. The sewn products may be designed and/or ordered at a brand/designer/retailer premise 140 or a customer premise 144. The manufacturing order (among other orders) can be scheduled to minimize transitions such as fabric roll, thread color, changes, etc. The manufacturer premise 102 can also request technical support to manufacture sewn products from a provider premise 134 as well as may be connected via the network device 122 to a network such as the internet, telephone network system, and/or cellular network system. The manufacturer server 104 may be a computer, processing or computing device, or program that is dedicated to managing network resources.

A manufacturer computing device 106 can communicate with the sewn product making apparatus for updating software/firmware, importing/exporting product-related data, modifying operations of the components of the sewn product making apparatus. The processor 108 can be configured to decode and execute any instructions received from one or more other electronic devices or servers. The processor may include one or more general-purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). Processing circuitry including the processor 108 can be configured to execute one or more computer-readable program instructions, such as program instructions to carry out any of the functions described in this description.

The memory 110 can include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions. The memory 110 may comprise modules implemented as a program executable by processor(s) 108.

The motion profiling module 112, which receives a computer aided design file, can generate a product construction file based on the computer aided design file and a product making path based on the product construction file using a path generation module. The motion profiling module 112 can instruct a sewing device 124, fabric mover(s) 126, vision device(s) 130, and determine whether the actual path and position and/or status of the product are correct. If the path is complete, the motion profiling module 112 can stop the sewing device 124, fabric mover(s) 126, and/or vision device(s) 130.

The product construction module 114, which receives a configuration file, can determine the section shape; update the configuration file for a curved shape, straight shape, or other shape; determine if the sew path is complete; and return to the motion profiling module 112. The path generation module 116, which can generate a path based on a sew curve (or path) and a desired stitch density, can generate time parameters, and can generate motion constraints. In some implementations, this may be optional and used for special cases to improve the appearance of a stitch type on specific set of products.

The HMI, or human machine interface, 118 can either accept inputs from users or provide outputs to the users or may perform both the actions. In one case, a user can interact with the interfaces using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interfaces can either be implemented as a command line interface (CLI), a human machine interface (HMI), a voice interface, or a web-based user-interface, at element 118.

The input/output devices or I/O devices 120 can comprise components used to facilitate connections of the processor to other devices such as the sewing device 124, fabric mover(s) 126, secondary operation device(s) 128, and/or vision device(s) 130, and therefore, for instance, comprise one or more serial, parallel, small system interface (SCSI), universal serial bus (USB), or IEEE 1394 (i.e., Firewire™) connection elements.

The networking device(s) 122 can comprise the various components used to transmit and/or receive data over a network. The networking device(s) 122 can include a device that can communicate both inputs and outputs, for instance, a modulator/demodulator (i.e., modem), a radio frequency (RF) or infrared (IR) transceiver, a telephonic interface, a bridge, a router, as well as a network card, etc.

The sewing device 124 facilitates sewing the product materials together and can be configured to sew the perimeter or other path on the product material based on tracking a pattern generated. In additional embodiments, the sewing device 124 can include a knife device in order to cut threads, stitches, materials from the workpiece etc. The fabric mover(s) 126, or material mover, can facilitate moving the product materials during the cutting and sewing operations, at element 126. The secondary operation device(s) 128 can include stacking device(s), folding device(s), label manipulation device(s), and/or other device(s) that assist with the preparation, making and/or finishing of the sewn product.

The vision device(s) 130 can facilitate detecting the movement of the sewn product material and inspecting the sewn product material for defects during a sewing and cutting operation. Further, the vision device(s) 130 can facilitate detecting markings on the product material before cutting or sewing the product material. A vision device 130 may be, but is not limited to, an RGB camera, an RGB-D camera, near infrared (NIR) camera, time of flight camera, IP camera, light-field camera, monorail camera, multiplane camera, rapatronic camera, stereo camera, still camera, thermal imaging camera, acoustic camera, rangefinder camera, etc., at element 130. The RGB-D camera is a digital camera that can provide color (RGB) and depth information for pixels in an image.

The local interface 132 can be, for example, but not limited to, one or more buses or other wired or wireless connections, as is known in the art. The local interface 132 can have additional elements, which are omitted for simplicity, such as controllers, buffers (caches), drivers, repeaters, and receivers, to enable communications. Further, the local interface 132 can include address, control, and/or data connections to enable appropriate communications among the components, at element 132.

The provider premise 134 can design, engineer, and manufacture sewn product making machines. For example, the provider premise 134 can design a roll-based towel or rug system. The provider server 136 of the provider premise 134 can be a computer, processing or computing device, or program that is dedicated to managing network resources. The motion profiling module 138 of the provider premise 134, which receives a computer aided design file, can generate a product construction file based on the computer aided design file and can generate a product making path based on the product construction file using a path algorithm. The motion profiling module 138 can instruct the sewing device 124, fabric mover(s) 126, vision device(s) 130, and can determine whether the actual path and the position and/or status of the product are correct. If the path is complete, the motion profiling module 138 can stop the knife device, sewing device 124, fabric mover(s) 126 and vision device(s) 130, at element 138.

A brand/designer/retailer premise 140 can place a manufacture order at the manufacturer premise 102 that determines how to automate the manufacturing using the sewn product making machines, element 140. A brand/designer/retailer user device 142 can be a processing or computing device such as a laptop, smartphone, tablet, computer, or smart speaker, element 142. A customer premise 144 can place purchase orders at the brand/designer/retailer premise 140 including details such as color, size, material, or edge treatment. A customer device 146 can be a user device such as a laptop, smartphone, tablet, computer, or smart speaker, element 146.

The cloud 148 or other communication network can be a wired and/or a wireless network. The communication network, if wireless, can be implemented using communication techniques such as visible light communication (VLC), worldwide interoperability for microwave access (Wi-MAX), long term evolution (LTE), wireless local area network (WLAN), infrared (IR) communication, public switched telephone network (PSTN), radio waves, and/or other communication techniques known in the art. The communication network may allow ubiquitous access to shared pools of configurable system resources and higher-level services that can be rapidly provisioned with minimal management effort, often over the Internet, and relies on sharing of resources to achieve coherence and economies of scale, like a public utility, while third-party clouds enable organizations to focus on their core businesses instead of expending resources on computer infrastructure and maintenance, at element 148.

Functioning of the manufacturer premise 102 will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
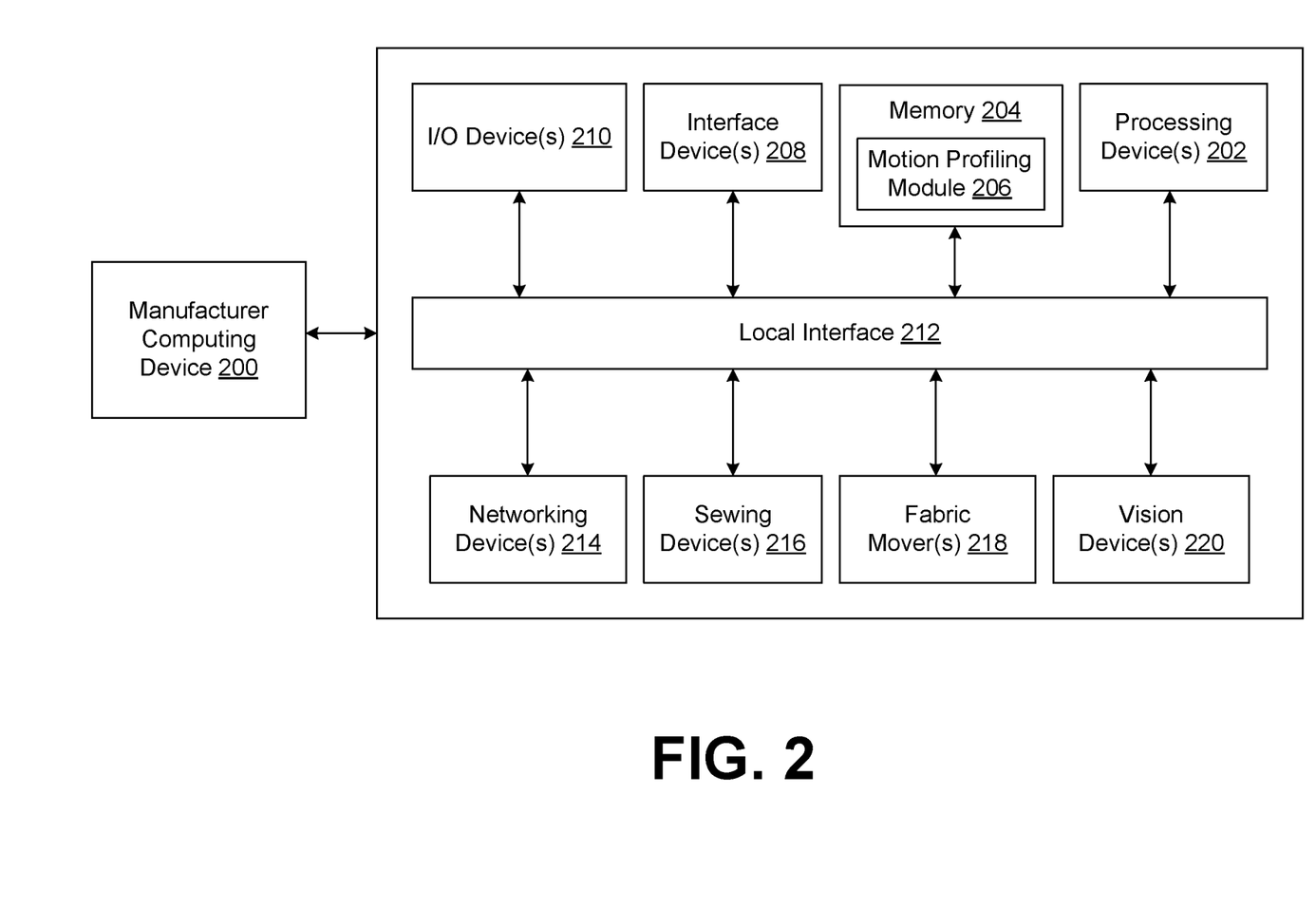
FIG. 2 illustrates an example of a manufacturer premise, according to various embodiments of the present disclosure.

The schematic diagram of FIG. 2 shows the architecture, functionality, and operation of a possible implementation of the manufacturer premise 102. As illustrated in the example of FIG. 2, the components can include a manufacturer computing device 200, which can communicate with the sewn product making apparatus (or robotic system) for updating software and/or firmware, importing and/or exporting product-related data, and/or modifying operations of the components of the sewn product making apparatus, at element 200.

Processing device(s) 202 can be configured to decode and execute any instructions received from one or more other electronic devices or servers. The processing device(s) 202 can include one or more general-purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor 108 can be configured to execute one or more computer-readable program instructions, such as program instructions to carry out any of the functions described in this description, element 202. A memory 204 can include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions. The memory 204 can comprise modules implemented as a program.

A manufacturer premise motion profiling module 206 (138 of FIG. 1) which receives a computer aided design file, can generate a product construction file based on the computer aided design file and can generate a product making path based on the product construction file using a path generation module. The motion profiling module 206 can instruct the sewing device 216, fabric mover(s) 218, and vision device(s) 220, and can determine whether the actual path and the position and/or status of the product are correct. If the path is complete, the motion profiling module 206 can stop the sewing device 216, fabric mover(s) 218, and vision device(s) 220, at element 206.

Interface device(s) 208 can either accept inputs from users or provide outputs to the users or may perform both the actions. In one case, a user can interact with the interfaces using one or more user-interactive objects and devices. The user-interactive objects and devices can comprise user input buttons, switches, knobs, levers, keys, trackballs, touchpads, cameras, microphones, motion sensors, heat sensors, inertial sensors, touch sensors, or a combination of the above. Further, the interfaces can either be implemented as a command line interface (CLI), a human machine interface (HMI), a voice interface, or a web-based user-interface, at element 208.

Input/output devices or I/O devices 210 can comprise components used to facilitate connections of the processor(s) 108 to other devices such as the sewing device 216, fabric mover(s) 218, and/or vision device(s) 220 and therefore, for instance, comprise one or more serial, parallel, small system interface (SCSI), universal serial bus (USB), or IEEE 1394 (i.e., Firewire™) connection elements, element 210.

A local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, to enable communications. Further, the local interface can include address, control, and/or data connections to enable appropriate communications among the components. In some embodiments the vision device(s) 220 may communicate directly with the sewing device 216 without communication through the local interface 212.

A networking device 214 can comprise various components used to transmit and/or receive data over a network. The networking device(s) 122 can include a device that can communicate both inputs and outputs, for instance, a modulator/demodulator (i.e., modem), a radio frequency (RF) or infrared (IR) transceiver, a telephonic interface, a bridge, a router, as well as a network card, etc., element 214.

A sewing device 216 facilitates sewing the product materials together and can be configured to sew based on a product construction file. In various implementations, the sewing device 216 can include a knife device in order to cut threads, stitches, materials from the workpiece etc. A fabric mover 218 or material mover can facilitate moving the product materials during the cutting and sewing operations, at element 218. Vision device(s) 220 can facilitate detecting the movement of the sewn product material and inspecting the sewn product material for defects during a sewing and cutting operation. Further, the vision device 220 can facilitate detecting markings on the product material before cutting or sewing the product material. A vision device 220 can be, but is not limited to, an RGB-D camera, time of flight camera, IP camera, light-field camera, monorail camera, multiplane camera, rapatronic camera, stereo camera, still camera, thermal imaging camera, acoustic camera, rangefinder camera, etc.

Functioning of the motion profiling module 112/206 will now be explained with reference to FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
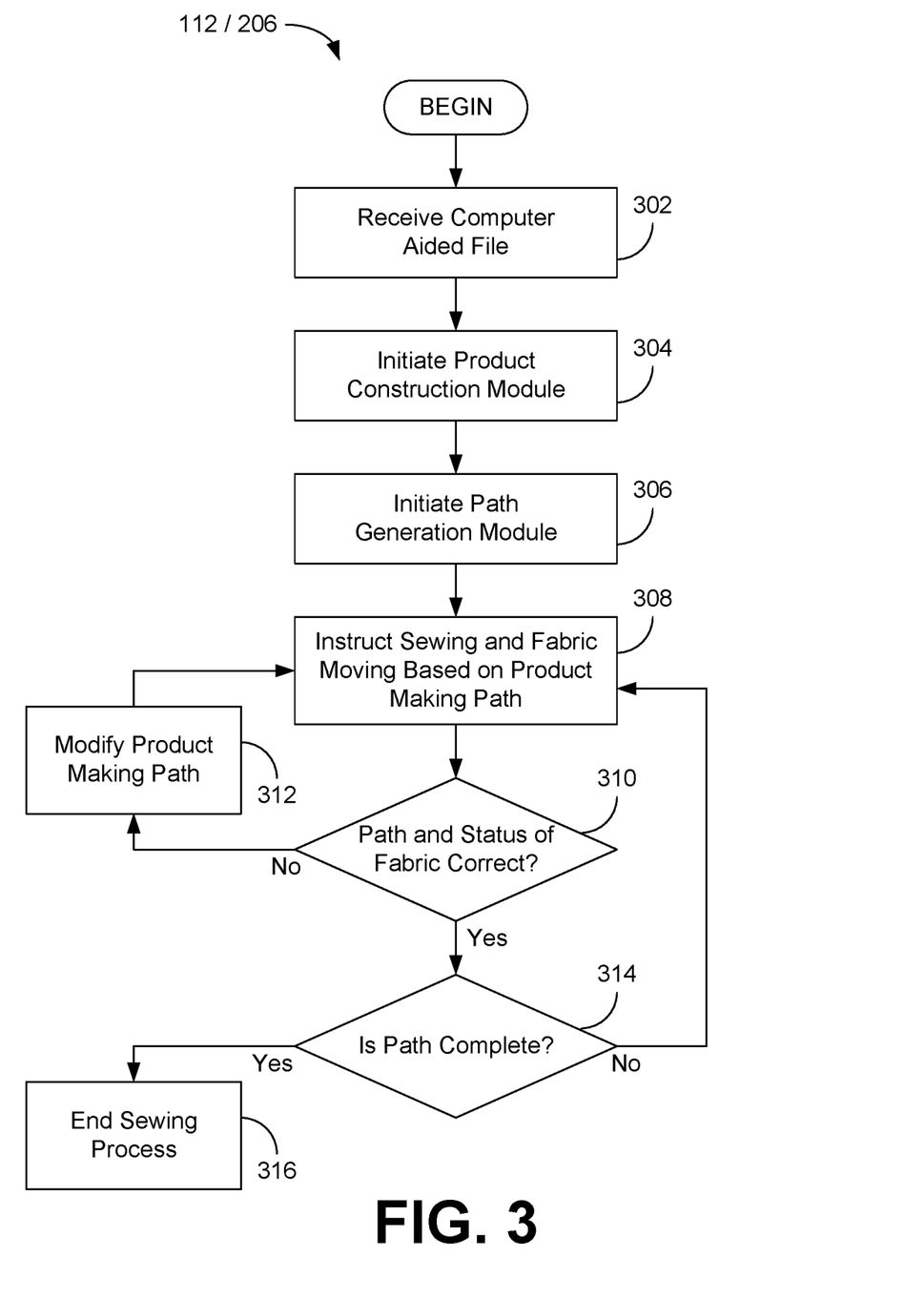
FIG. 3 illustrates an example of a motion profiling module, according to various embodiments of the present disclosure.

The flow chart of FIG. 3 shows the architecture, functionality, and operation of a possible implementation of the motion profiling module 112/206. The process begins at 302 with the motion profiling module 112/206 of a sewn product making apparatus receiving a computer aided design file, such as a DXF file, that is associated with the construction of a sewn product, such as a shirt, pants, rugs, towels, sheets, pillow cases, etc. In an example embodiment, the computer aided design (CAD) file can model curves that can be specified as a series of lines, even when curves are intended. The motion profiling module 112/206 can detect lines and curves and apply a curve fitting algorithm to minimize the number of curves. Alternatively, and/or additionally, the motion profiling module 112/206 may receive vector graphics or other design files that can be translated into a product construction file, at 302. At 304, the motion profiling module 112/206 initiates the product construction module 114. Then at 306, the motion profiling module 112/206 initiates the path generation module 116. Next, the motion profiling module 112/206 can instruct the sewing device 124, fabric mover(s) 126, and/or vision device(s) 130, amongst others, based on the generated product making path, for making the sewn product at 308.

At 310, the motion profiling module 112/206 then determines whether the actual path and the position and/or status of the product are correct. Evaluation of operations along or deviations from the path can be based upon data received from a vision system comprising one or more vision device(s) 130. For example, the vision system can monitor for sewing deviations that exceed a manufacturing tolerance or motion constraint such as, e.g., a threshold distance from the defined product making path. If it is determined at 310 that the path is not correct, the motion profiling module 112/206 modifies the product making path at 312 to adjust the position and/or status of the product and the process returns to 308 for making the sewn product. If it is determined at 310 that the path is correct, then the motion profiling module 112/206 determines if the path is complete at 314. If the path is not complete then the process returns to 308. If the path is complete at 314, then the motion profiling module 112/206 can stop the sewing device 124, fabric mover(s) 126, and/or vision device(s) 130, among others of the sewn product making apparatus at 316.

Functioning of the product construction module 114 will now be explained with reference to FIG. 4. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
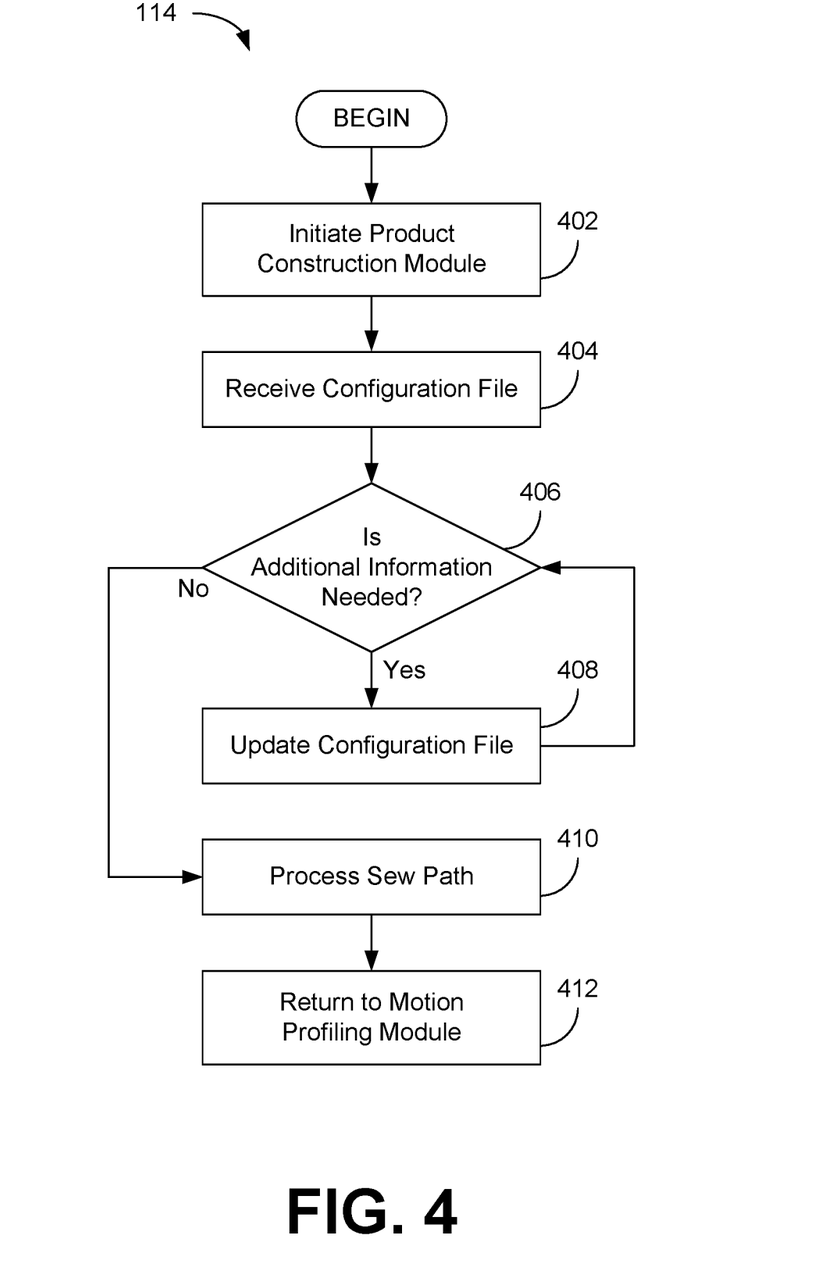
FIG. 4 illustrates an example of a product construction module, according to various embodiments of the present disclosure.

The flow chart of FIG. 4 shows the architecture, functionality, and operation of a possible implementation of the product construction module 114. The process begins at 402 with the product construction module 114 being initiated by, e.g., the motion profiling module 112 at 304 of FIG. 3. At 404, the product construction module 114 can receive a configuration file, e.g. the computer aided design (CAD) file of 302 in FIG. 3. In some embodiments, the configuration file can have some or all of the information needed to construct the sewn product. For example, the configuration file can include manufacturing tolerances for the sewn product, as well as other fabrication information. In some cases, multiple configuration files can be used to provide the configuration information (e.g., a first file can contain data about stitch information, I/O timings, robot motion limits (e.g., maximum velocity), etc. and a second file can contain path and/or shape data). The configuration file can also include information (e.g., path and/or shape data) that comes (in whole or in part) from an image taken of the product. The configuration file can be in a YAML, XML, or other CAD configuration, to name a few, at 404.

Review of the configuration file (or files) at 404 can determine if any additional information is needed. For example, missing information can include, but is not limited to, stitch type, stitch specifications, seam lines, order of operations, or input/output timing, to name a few. If there is missing information at 406, then the configuration file can be updated at 408 to add the information. In some implementations, the missing information can be obtained from the provider premise 134, brand/designer/retailer premise 140 or customer premise 144, or can be inputted manually by a user, at 408. When no additional information is needed at 406, the flow proceeds to 410.

The product construction module 114 can process at least a section of the sew path (or curve), at 410. The product construction module 114 can process (e.g., reformat) the configuration file to generate a product construction file that is directly readable by the system at 410. In some embodiments, the product construction file can include metadata to be able to create a motion path for the sewing device 216, at 410. The product construction module 114 then returns to the motion profiling module 112 at 412, where at 306 (FIG. 3) the product construction file will be sent to the path generation module 116. In some implementations, there may be previously generated configuration files that an operator may choose from. In various embodiments, there may be a dynamically created configuration file based on the data collected from the vision device(s) 130 or from a third party.

Functioning of the path generation module 116 will now be explained with reference to FIG. 5. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
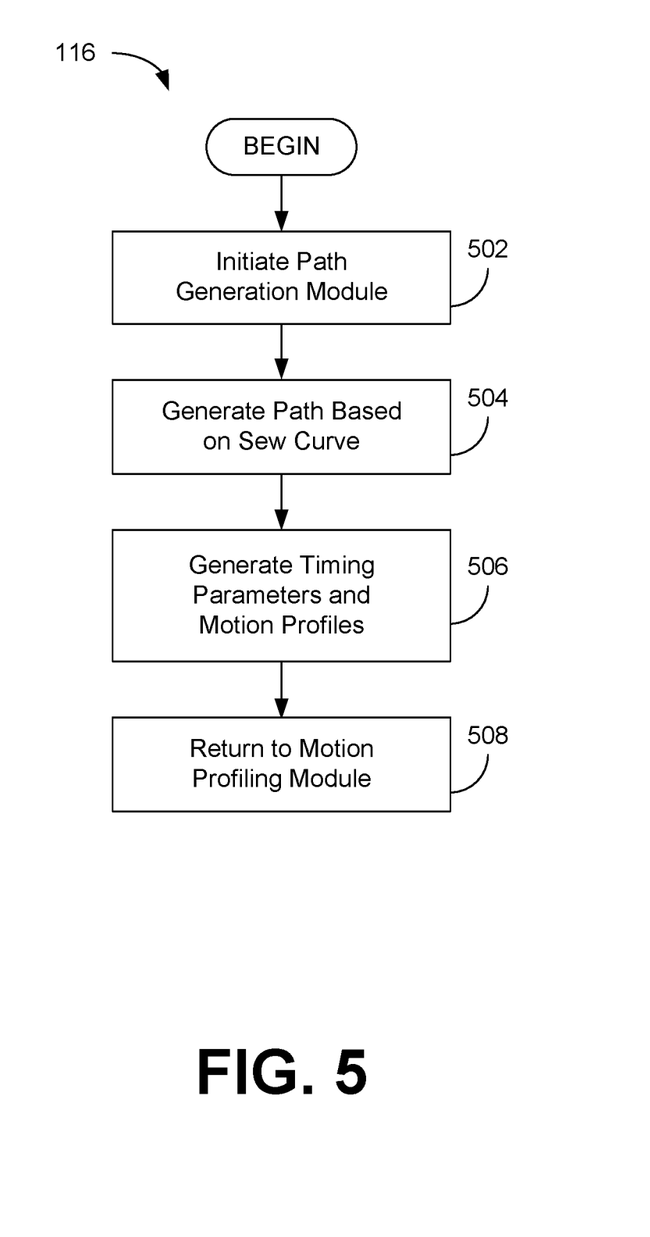
FIG. 5 illustrates an example of a path generation module, according to various embodiments of the present disclosure.

The flow chart of FIG. 5 shows the architecture, functionality, and operation of a possible implementation of the path generation module 116. The process begins at 502 with the path generation module 116 being initiated by, e.g., the motion profiling module 112 at 306 of FIG. 3. The path generation module 116 can generate a path from a sew curve (or path) at 504. From the sewing path, end-effector positions can be generated for the sewn product making apparatus (or robotic system). A sew line can be set parallel to the sewing machine feed direction, however this can be modified using knife optimization or with hand tuning, at 504.

The path generation module 116 can evaluate the stitch density, which can be a desired characteristic of the finished product. The stitch density can specify how close the needle penetrations are, which can be used in the path generation for controlling the sewing robot. For serging, the sew line has a width, and to achieve desired coverage, the motion path should not be calculated with respect to the needle position, but to a point forward of the needle determined by the sewing machine and sewing parameters. The stitch density and sew-speed interpolation parameters control this. This step describes a modification to the sew path or curve to improve the appearance of a stitch type on a specific set of goods and is not needed to complete the overall process, at 504.

Next at 506, the path generation module 116 can generate time parameters and motion constraints. After the path is generated, motion limits may be applied to each curve. For acceleration-limited motion, a trapezoidal profile can be generated (accelerate until maximum speed, then hold until deceleration is needed). A similar process may be implemented for a constant jerk. A variety of limits can be instituted such as, e.g., velocity, acceleration, and jerk for each axis and the sew line, at 506. At 508, the path generation module 116 then returns to the motion profiling module 112, for sewing and fabric moving instructions at 308.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system for making a sewn product, comprising:
   a sewing device;
   one or more fabric movers;
   a vision system comprising one or more vision devices:
   a motion profiling module; and
   processing circuitry comprising a processor, wherein execution of the motion profiling module:
      generates a product making path based upon a product construction file associated with manufacturing a product;
      instructs the sewing device and the one or more fabric movers to automatically sew product material forming the product based upon the product making path;
      monitors the sewing of the product material along the product making path using the vision system during the sewing of the product material, and
      in response to detecting a deviation from the product making path, modifies the product making path and instructs the sewing device and the one or more fabric movers to adjust the sewing of the product material based upon the modified product making path.

2. The system of claim 1, wherein the product construction file is generated from a configuration file comprising a sewing path or curve based at least in part upon computer aided design information associated with the product.

3. The system of claim 2, wherein execution of the motion profiling module generates the product construction file based at least in part upon the computer aided design information.

4. The system of claim 3, wherein generating the product construction file comprises processing at least a section of the sewing path or curve using the computer aided design information.

5. The system of claim 4, wherein generating the product construction file further comprises:
   determining whether information needed to complete generation of the product making path is missing from the configuration file; and
   in response to identification of missing information, obtaining the missing information and updating the configuration file prior to generating the product construction file.

6. The system of claim 5, wherein the information missing from the configuration file includes stitch type, stitch specifications, order of operations, or input/output timing.

7. The system of claim 2, wherein the product making path is generated based upon the sewing path or curve.

8. The system of claim 7, wherein generating the product making path comprises providing manufacturing tolerances for sewing the product.

9. The system of claim 1, wherein the product making path is modified based upon time parameters and motion constraints associated with the product making path.

10. The system of claim 1, wherein the deviation is identified by the motion profiling module from information provided by the vision system.

11. The system of claim 10, wherein the deviation comprises a variation in a sewn seam from the product making path that exceeds a threshold distance.

12. The system of claim 11, wherein the threshold distance is less than a manufacturing tolerance of the product.

13. The system of claim 10, wherein the one or more vision devices comprise an RGB-D camera configured to provide color and depth information for pixels in a captured image.

14. A method for making a sewn product, comprising:
   generating a product making path based upon a product construction file associated with manufacturing a product;
   instructing a sewing device and one or more fabric movers to automatically sew product material forming the product based upon the product making path;
   in response to detecting a deviation from the product making path during the sewing of the product material, modifying the product making path; and
   instructing the sewing device and the one or more fabric movers to adjust the sewing of the product material based upon the modified product making path.

15. The method of claim 14, comprising monitoring the sewing of the product material using a vision system comprising one or more vision devices, wherein the deviation is detected based upon data provided by the vision system.

16. The method of claim 14, wherein the product construction module is generated from a configuration file comprising a sewing path or curve based upon computer aided design information associated with the product.

17. The method of claim 16, comprising:
   determining whether information needed to complete generation of the product making path is missing from the configuration file;
   updating the configuration file with the missing information; and processing at least a section of the sewing path or curve using the configuration file.

18. The method of claim 17, wherein the missing information is obtained from user input.

19. The method of claim 16, wherein the product making path is generated based upon the sewing path or curve.

20. The method of claim 19, wherein the product making path comprises stitch density information.

* * * * *